(12) United States Patent
Stulz et al.

(10) Patent No.: US 7,499,297 B2
(45) Date of Patent: Mar. 3, 2009

(54) LOW-HARMONICS, POLYPHASE CONVERTER CIRCUIT

(75) Inventors: Christian Stulz, Zürich (CH); Christoph Eichler, Untersiggenthal (CH); Erich Suter, Baden (CH); Adrian Zuckerberger, Untersiggenthal (CH); Pieder Jörg, Domat/Ems (CH); Thomas Berner, Waldshut-Tiengen (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 11/639,300

(22) Filed: Dec. 15, 2006

(65) Prior Publication Data

US 2007/0153555 A1 Jul. 5, 2007

Related U.S. Application Data

(63) Continuation of application No. PCT/CH2005/000083, filed on Feb. 15, 2005.

(30) Foreign Application Priority Data

Jun. 23, 2004 (EP) .................................. 04405389

(51) Int. Cl.
*H02M 5/458* (2006.01)
(52) U.S. Cl. .......................................... 363/37; 363/65
(58) Field of Classification Search .................. 363/34, 363/36, 37, 39, 40, 148, 65, 67, 71
See application file for complete search history.

(56) References Cited

U.S. PATENT DOCUMENTS 3,582,756 A * 6/1971 McMurray ..................... 363/1
6,014,323 A * 1/2000 Aiello et al. .................. 363/71
6,567,283 B2 * 5/2003 Welches ....................... 363/89

FOREIGN PATENT DOCUMENTS

EP 0 913 918 A2 5/1999
GB 2330254 A * 4/1999

* cited by examiner

*Primary Examiner*—Adolf Berhane
(74) *Attorney, Agent, or Firm*—Buchanan Ingersoll & Rooney PC

(57) ABSTRACT

A polyphase converter circuit having $p \geq 3$ phases (R, Y, B) and a converter circuit element provided for each phase (R, Y, B) is specified, each converter circuit element having a rectifier unit, a DC voltage circuit which is connected to the rectifier unit and an inverter unit which is connected to the DC voltage circuit. In addition, a first AC voltage output of each inverter unit forms a phase connection, and second AC voltage outputs of the inverter units are star-connected. In order to produce harmonics which are as low as possible with respect to the fundamental of the voltage and the current of an electrical AC voltage system which is connected on the input side to the converter circuit, n transformers are provided, each having a primary winding and m three-phase secondary windings, where $n \geq 2$ and $m \geq 3$. Furthermore, p sets of secondary windings are provided, each set of secondary windings being formed by in each case $$\frac{m}{p}$$

three-phase secondary windings of each transformer, and each set of secondary windings with the associated secondary windings being connected to the rectifier unit of a respective converter circuit element.

19 Claims, 8 Drawing Sheets

LOW-HARMONICS, POLYPHASE CONVERTER CIRCUIT

CROSS REFERENCE TO RELATED APPLICATIONS

This application claims priority under 35 U.S.C. §119 to EP Application 04405389.0 filed in European Patent Office on 23 Jun. 2004, and as a continuation application under 35 U.S.C. §120 to PCT/CH2005/000083 filed as an International Application on 15 Feb. 2005 designating the U.S., the entire contents of which are hereby incorporated by reference in their entireties.

FIELD

Polyphase converter circuits relating to the field of power electronics are disclosed.

BACKGROUND INFORMATION

Polyphase converter circuits are used today in a wealth of power electronics applications. In this case, the requirements for such a converter circuit are firstly to produce harmonics as little as possible in an electrical AC voltage system which is generally connected on the input side to the converter circuit and also on phases of an electrical load which is more conventionally connected to the converter circuit, and secondly to transmit powers which are as high as possible using as few electronic components as possible. A suitable polyphase converter circuit is specified in EP 0913 918 A2 and shown in FIG. 1. Therein, the converter circuit is in the form of an 18-pulse, three-phase converter circuit and has one converter circuit element for each phase, each converter circuit element comprising an 18-pulse rectifier unit, a DC voltage circuit which is connected to the rectifier unit and an inverter unit which is connected to the DC voltage circuit. In accordance with EP 0913 918 A2 or in accordance with FIG. 1, a first AC voltage output of each inverter unit forms a phase connection. Second AC voltage outputs of the inverter units of the converter circuit are also star-connected. Furthermore, the converter circuit has a single transformer having a primary winding which is generally connected to the electrical AC voltage system. Owing to the pulse number of 18 for the converter circuit, the transformer has nine three-phase secondary windings, in each case three of the nine three-phase secondary windings forming a set of secondary windings such that in total three sets of secondary windings are formed.

GB 2 330 254 A likewise discloses a polyphase converter circuit in which one converter circuit element is likewise provided for each phase, each converter circuit element having three rectifier units. A DC voltage circuit and an inverter unit which is connected to the DC voltage circuit are then connected to each rectifier unit. In addition, the converter circuit from GB 2 330 254 A has three transformers, each having a primary winding and three three-phase secondary windings. Furthermore, each secondary winding is associated with one of the three converter circuit elements, in this case each rectifier unit of the associated converter circuit element being connected to precisely one secondary winding associated with this converter circuit element.

One problem with a polyphase converter circuit in accordance with EP 0913 918 A2 is the fact that, despite the pulse number of 18 for the rectifier units and thus the converter circuit overall, harmonics which are relevant on the primary winding and thus in the electrical AC voltage system and which are greater than the seventeenth harmonic with respect to the fundamental of the voltage and the current of the electrical AC voltage system may occur, and these harmonics then place a correspondingly severe load on the electrical AC voltage system, in particular in the case of a weak electrical AC voltage system having a high rated impedance. Such effects of harmonics on the converter circuit are therefore highly undesirable.

SUMMARY

A polyphase converter circuit is disclosed which produces low harmonics with respect to the fundamental of the voltage and the current of an electrical AC voltage system which is connected on the input side to the converter circuit, said converter circuit also being of simple and robust design.

An exemplary polyphase converter circuit comprises $p \geq 3$ output phases and a converter circuit element provided for each phase, each converter circuit element having a rectifier unit, a DC voltage circuit which is connected to the rectifier unit and an inverter unit which is connected to the DC voltage circuit. A first AC voltage output of each inverter unit can form a phase connection. Furthermore, second AC voltage outputs of the inverter units are star-connected. Accordingly, n transformers are now generally provided, each having a primary winding and m three-phase secondary windings, where $n \geq 2$ and $m \geq 3$. Further, p sets of secondary windings can be provided, each set of secondary windings being formed by in each case $$\frac{m}{p}$$

three-phase secondary windings of each transformer, and each set of secondary windings with the associated secondary windings being connected to the rectifier unit of a respective converter circuit element. Each set of secondary windings is thus associated with only in each case one converter circuit element or the rectifier unit of only in each case one converter circuit element, in this case all of the secondary windings of this set of secondary windings being connected to the rectifier unit of the associated converter circuit element. As a result of the fact that $n \geq 2$ transformers are provided and each set of secondary windings is formed by in each case $$\frac{m}{p}$$

three-phase secondary windings of each transformer, and each set of secondary windings with the associated secondary windings is connected to the rectifier unit of a respective converter circuit element, the effective pulse number of the converter circuit on the primary side of the transformer, i.e. on the side of the electrical AC voltage system which is connected to the converter circuit, is greater than the pulse number of a rectifier unit. The greater pulse number advantageously results in essentially only very low harmonics below the greater pulse number with respect to the fundamental of the voltage and the current of an electrical AC voltage system which is connected on the input side to the converter circuit. At best, i.e. depending on the operating state, a pulse number of 54 with respect to the fundamental of the voltage and the current of the electrical AC voltage system results, for example, on the primary side of the transformer in the case of a converter circuit according to the invention having rectifier units with a pulse number of 18, p=3 phases and n=3 transformers, with the result that essentially only very low harmonics which are lower than the fifty-third harmonic with respect to the fundamental of the voltage and the current of the electrical AC voltage system advantageously occur. The electrical AC voltage system, in particular a weak electrical AC voltage system having a high rated impedance, is thus not loaded or is loaded to only a small extent.

Such exemplary converter circuit is of simple and robust design owing to the abovementioned components used and their wiring.

BRIEF DESCRIPTION OF THE DRAWINGS

These and other objects, advantages and features of the present invention will become apparent from the detailed description below of exemplary embodiments of the invention in conjunction with the drawing.

The references used in the drawing and their significance are listed in summary in the list of references. In principle, the same parts are provided with the same references in the figures. The exemplary embodiments described are illustrative and not restrictive.

DETAILED DESCRIPTION

Figure 2:
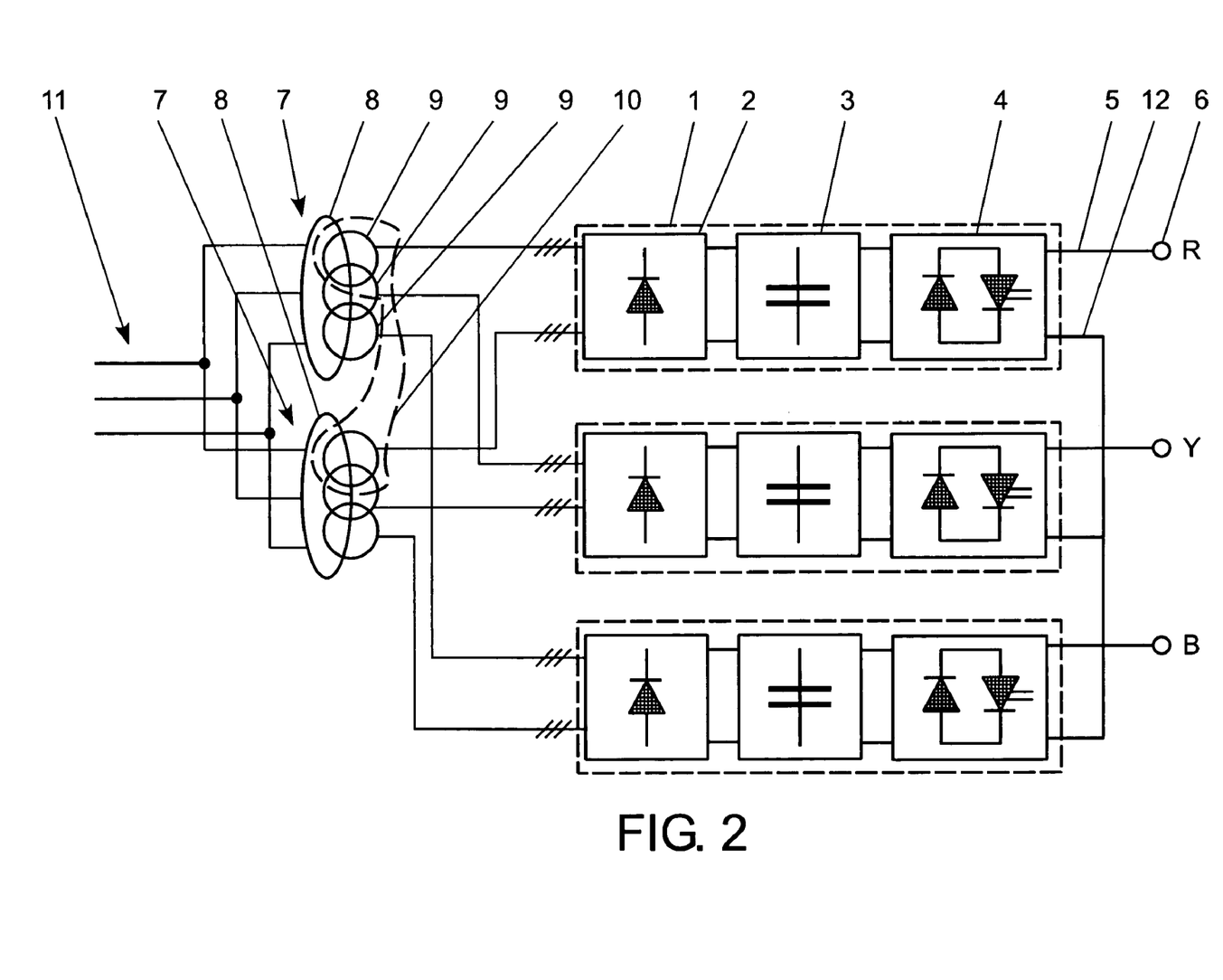
FIG. 2 shows a first exemplary embodiment of the polyphase converter circuit.

FIG. 2 shows a first exemplary embodiment of the polyphase converter circuit. The converter circuit shown in FIG. 2 has p=3 phases R, Y, B, p≧3 phases R, Y, B generally being conceivable. As shown in FIG. 2, the converter circuit comprises a converter circuit element 1 provided for each phase R, Y, B, each converter circuit element 1 having a rectifier unit 2, a DC voltage circuit 3 which is connected to the rectifier unit 2 and an inverter unit 4 which is connected to the DC voltage circuit 4. The rectifier unit 2 shown in FIG. 2 has a pulse number of x=12, the pulse number x indicating the number of switching pulses during one period of the voltage of an electrical AC voltage system 11 which is connected on the input side to the converter circuit. Furthermore, a first AC voltage output 5 of each inverter unit 4 forms a phase connection 6. In addition, second AC voltage outputs 12 of the inverter units 5 shown in FIG. 2 are star-connected.

Accordingly, n transformers 7 can be provided, each having a primary winding 8 and m three-phase secondary windings 9, where n≧2 and m≧3. As shown in FIG. 2, there are n=2 transformers, each having m=3 three-phase secondary windings 9. Furthermore, p sets of secondary windings 10 are generally provided, each set of secondary windings 10 being formed by in each case $$\frac{m}{p}$$

three-phase secondary windings 9 of each transformer 7, and each set of secondary windings 10 with the associated secondary windings 9 being connected to the rectifier unit 2 of a respective converter circuit element 1. Each set of secondary windings then comprises $$\frac{m \cdot n}{p}$$

secondary windings 9. As is also shown in FIG. 2, each set of secondary windings 10 is thus associated with only in each case one converter circuit element 1 or the rectifier unit 2 of only in each case one converter circuit element 1, in this case all of the secondary windings 9 of this set of secondary windings 10 being connected to the rectifier unit 2 of the associated converter circuit element 1. As shown in FIG. 2, in the case of p=3 phases R, Y, B, p=3 sets of secondary windings 10 are also provided, each set of secondary windings 10 being formed by in each case a three-phase secondary winding 9 of each transformer 7, and each set of secondary windings 10 comprising two secondary windings 9.

Figure 1:
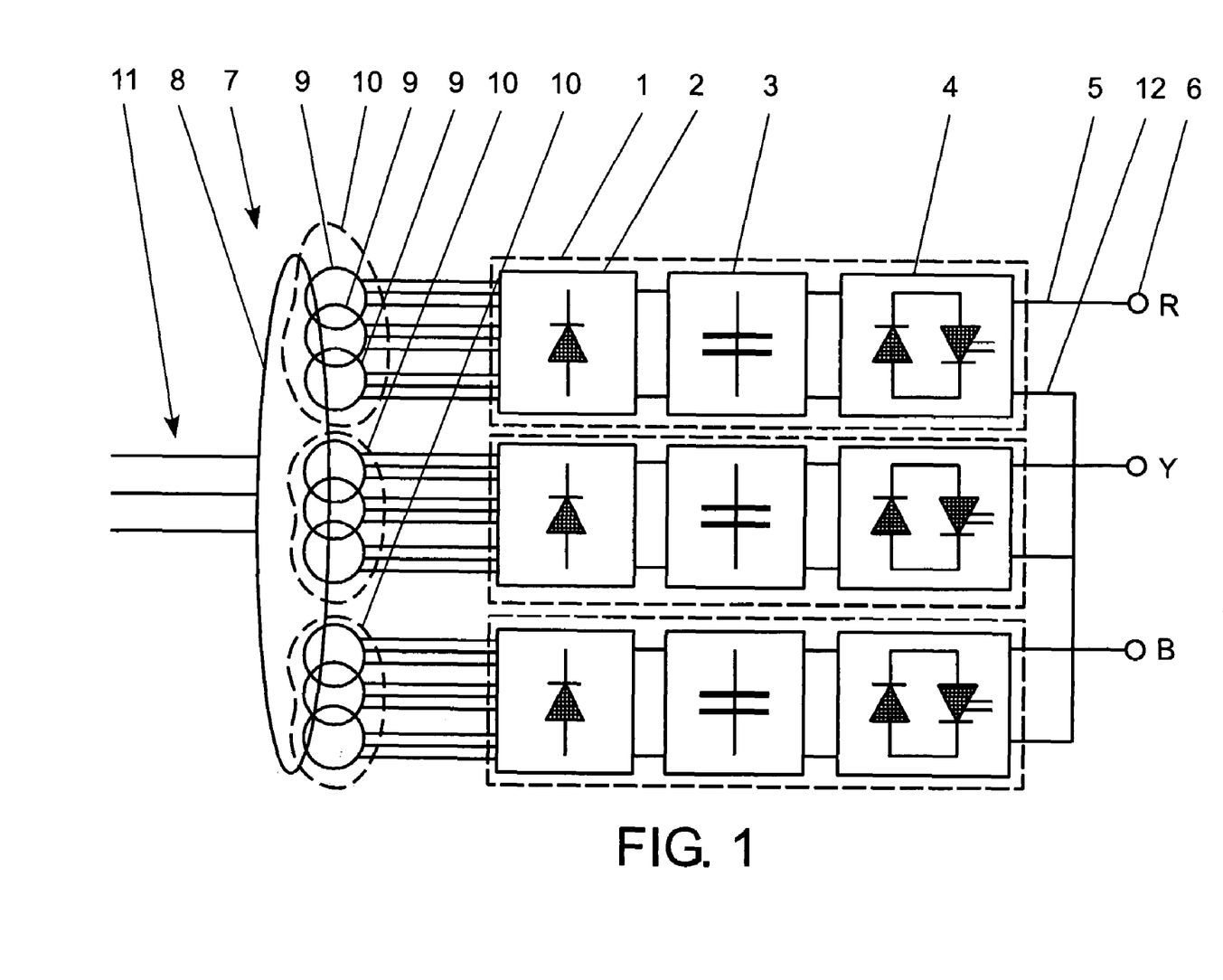
FIG. 1 shows a polyphase, 18-pulse converter circuit.
Figure 6:
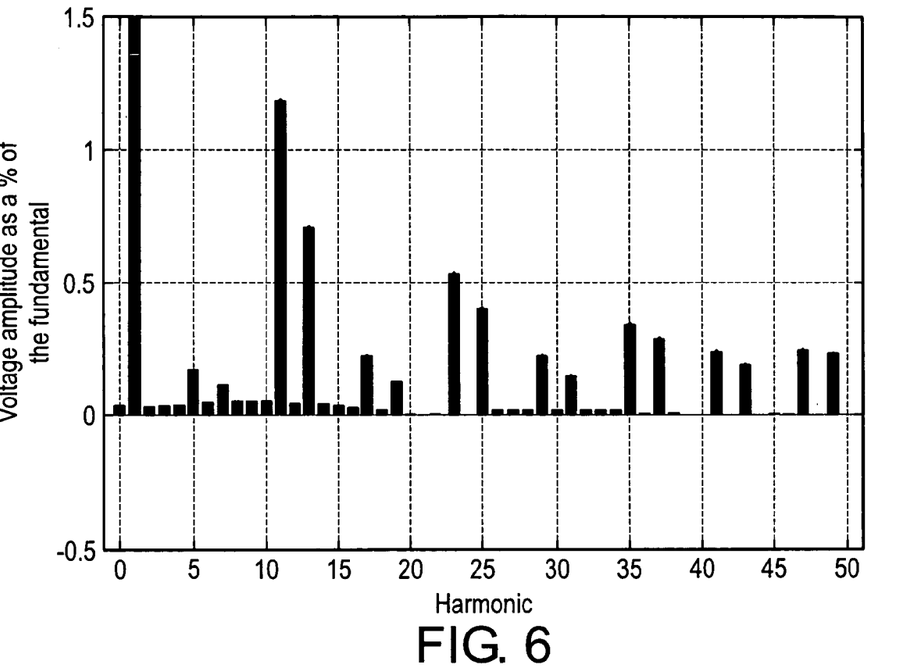
FIG. 6 shows an exemplary frequency spectrum of an input-side voltage of a polyphase, 12-pulse converter circuit.
Figure 7:
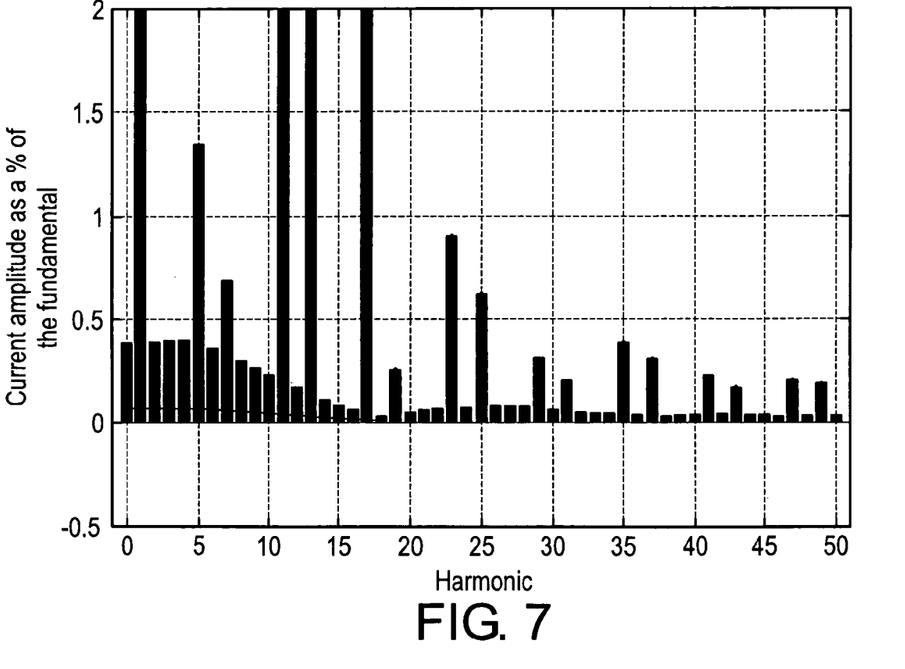
FIG. 7 shows an exemplary frequency spectrum of an input-side current of a polyphase, 12-pulse converter circuit.
Figure 8:
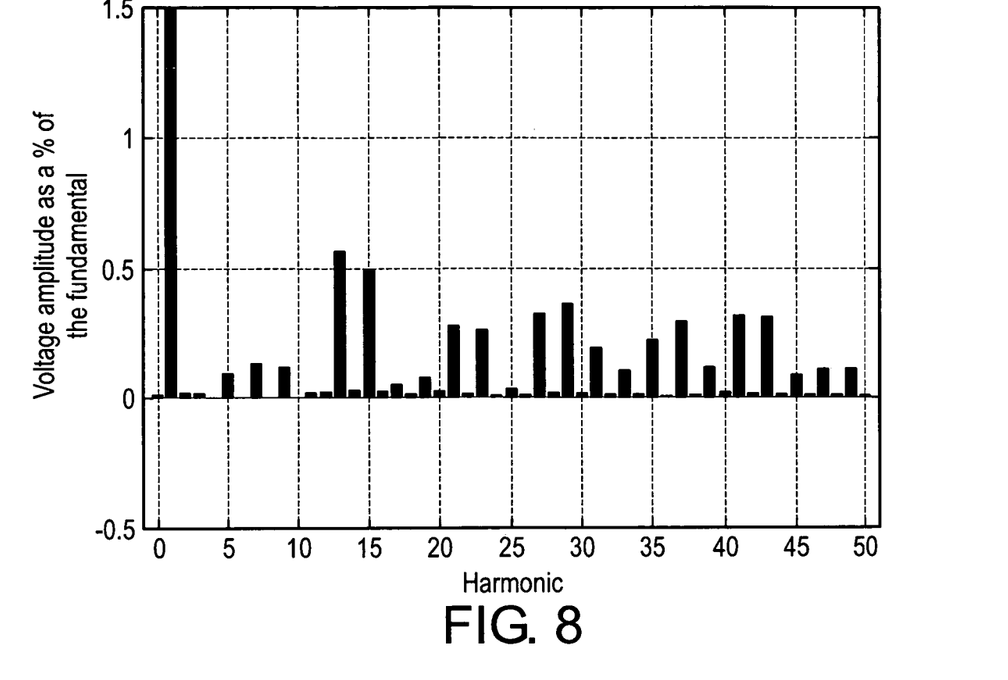
FIG. 8 shows an exemplary frequency spectrum of an input-side voltage of the converter circuit pertaining to the exemplary circuit as shown in FIG. 2.
Figure 9:
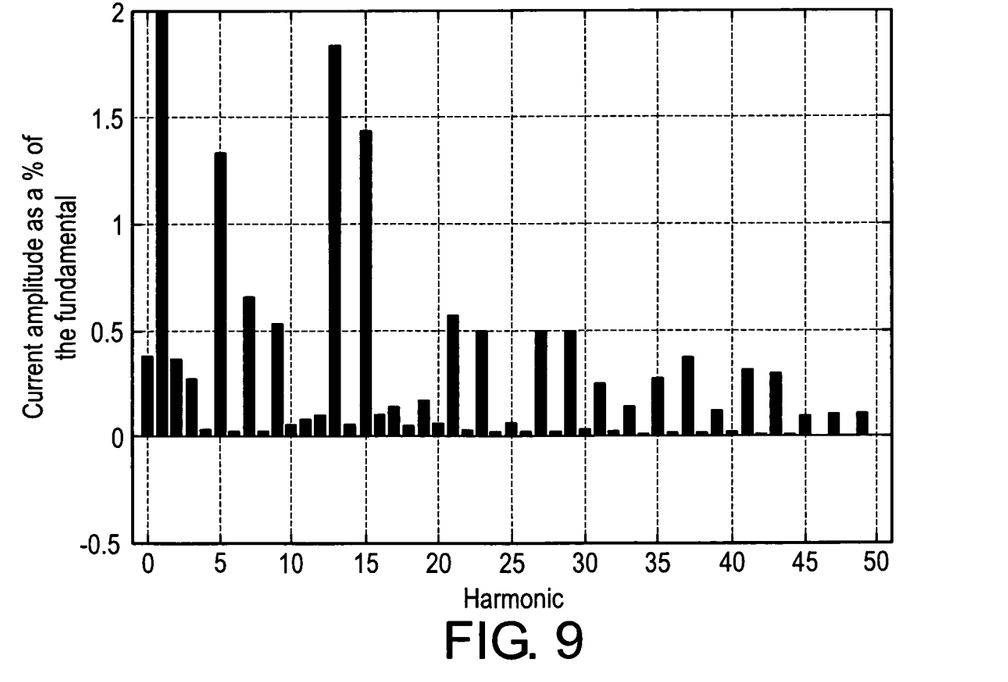
FIG. 9 shows an exemplary frequency spectrum of an input-side current of the converter circuit pertaining to the exemplary circuit as shown in FIG. 2.

Owing to the generally n≧2 transformers 7 and the fact that each set of secondary windings 10 is formed by in each case m/p three-phase secondary windings 9 of each transformer 7, and each set of secondary windings 10 with all of its associated secondary windings 9 is connected to the rectifier unit 2 of a respective converter circuit element 1, the effective pulse number of the converter circuit on the primary side 8 of the transformer 7, i.e. on the input side of the converter circuit, is greater than the pulse number of a rectifier unit 1. The greater pulse number advantageously results in essentially only very low harmonics below the greater pulse number with respect to the fundamental of the voltage and the current of an electrical AC voltage system 11 which is connected on the input side to the converter circuit. In addition, a frequency spectrum of an input-side voltage of a conventional polyphase converter circuit with a pulse number of x=12 for the rectifier unit 2 is shown in FIG. 6. The design for such a 12-pulse converter circuit corresponds to the known converter circuit described at the outset with a pulse number of x=18 as shown in FIG. 1, in contrast to FIG. 1 the conventional 12-pulse converter circuit having 12-pulse rectifier units, and the single transformer 7 in this case comprising six three-phase secondary windings 9, in each case two of the six three-phase secondary windings 9 forming a set of secondary windings 10 such that in total three sets of secondary windings 10 are formed. In addition, a frequency spectrum of an input-side current of a conventional polyphase converter circuit with a pulse number of x=12 for the rectifier unit 2 is shown in FIG. 7. In order to better illustrate the abovementioned advantages of the greater effective pulse number for the converter circuit according to the invention as shown in FIG. 2, a frequency spectrum of the input-side voltage of the converter circuit according to the invention shown in FIG. 2 is shown in FIG. 8, and a frequency spectrum of the input-side current of the converter circuit according to the invention shown in FIG. 2 is shown in FIG. 9. At best, i.e. depending on the operating state, a pulse number of 36 (x·p=36) with respect to the fundamental of the voltage and the current of the electrical AC voltage system 11 results, for example, on the primary side of the transformer 7 in the case of the converter circuit according to the invention having rectifier units 2 with a pulse number of x=12, p=3 phases R, Y, B and with n=2 transformers, with the result that essentially only very low harmonics which are lower than the thirty-fifth harmonic with respect to the fundamental of the voltage and the current of the electrical AC voltage system 11 advantageously occur. The electrical AC voltage system 11, for example a weak electrical AC voltage system having a high rated impedance, is thus advantageously not loaded or is loaded to only a small extent.

Figure 3:
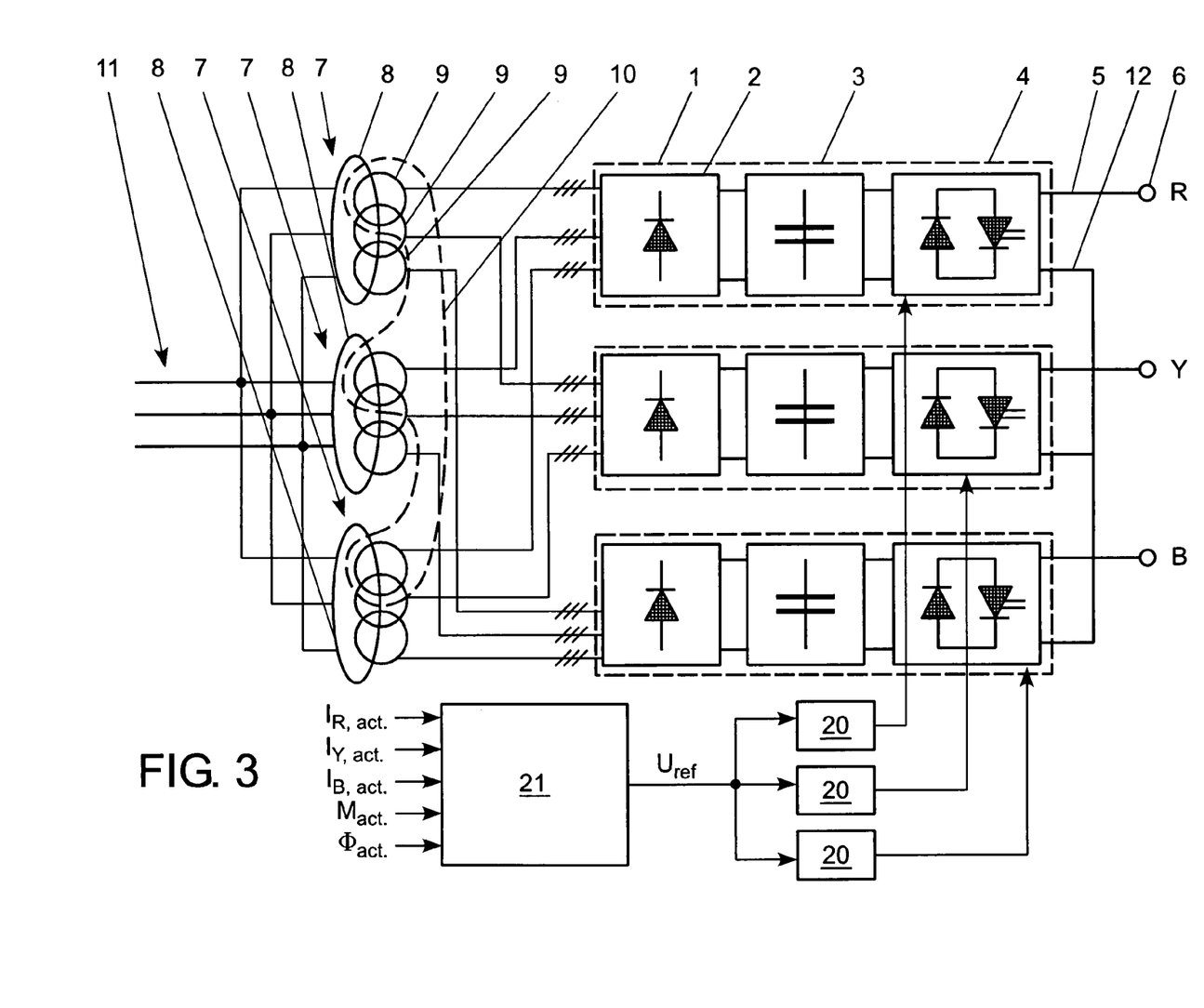
FIG. 3 shows a second exemplary embodiment of the polyphase converter circuit.

FIG. 3 shows a second exemplary embodiment of the polyphase converter circuit. In contrast to the first exemplary embodiment shown in FIG. 2, the respective rectifier unit 2 shown in FIG. 3 has a pulse number of x=18. In addition, in contrast to the first exemplary embodiment shown in FIG. 2, n=3 transformers are provided in the second embodiment shown in FIG. 3, each having m=3 three-phase secondary windings 9. As shown in FIG. 3, furthermore, in the case of p=3 phases R, Y, B, p=3 sets of secondary windings are also provided, each set of secondary windings 10 being formed by in each case a three-phase secondary winding 9 of each transformer 7, and each set of secondary windings 10 comprising three secondary windings 9. With the converter circuit in accordance with the second embodiment shown in FIG. 3, at best, i.e. depending on the operating state, a pulse number of 54 (x·p=54) with respect to the fundamental of the voltage and the current of the electrical AC voltage system results, for example, on the primary side of the transformer 7 having rectifier units 2 with a pulse number of x=18, p=3 phases R, Y, B and with n=3 transformers, with the result that essentially only very low harmonics which are lower than the fifty-third harmonic with respect to the fundamental of the voltage and the current of the electrical AC voltage system 11 advantageously occur.

Figure 10:
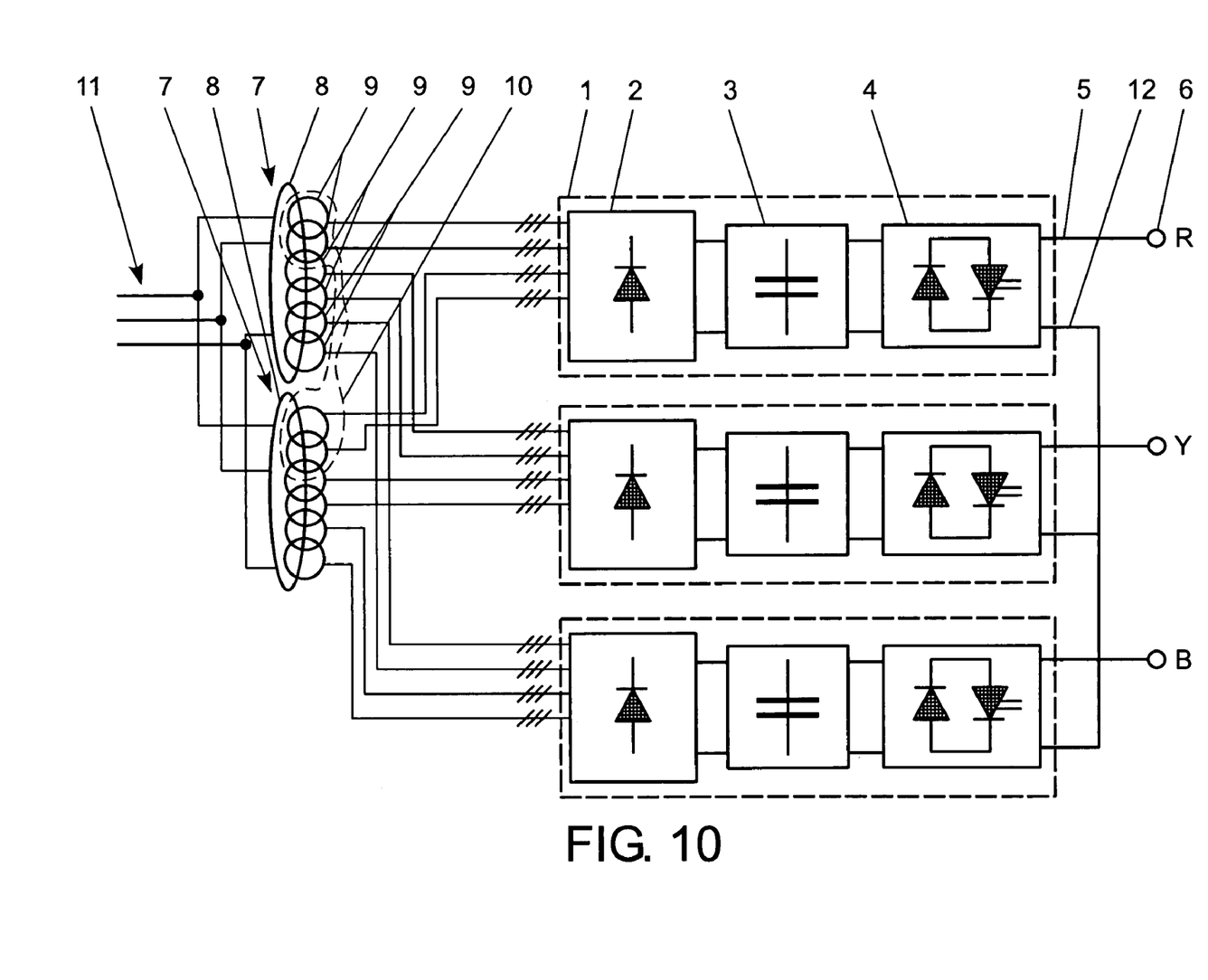
FIG. 10 shows a third exemplary embodiment of the polyphase converter circuit.

FIG. 10 shows a third exemplary embodiment of the polyphase converter circuit. In contrast to the first and second exemplary embodiments shown in FIG. 2 and FIG. 3, the respective rectifier unit 2 shown in FIG. 10 has a pulse number of x=24. In addition, in the third exemplary embodiment shown in FIG. 10, n=2 transformers are provided, each having m=6 three-phase secondary windings 9. As shown in FIG. 10, furthermore, in the case of p=3 phases R, Y, B, p=3 sets of secondary windings 10 are also provided, each set of secondary windings 10 being formed by in each case two three-phase secondary windings 9 of each transformer 7, and each set of secondary windings 10 comprising four secondary windings 9. With the converter circuit in accordance with the third exemplary embodiment shown in FIG. 10, at best, i.e. depending on the operating state, a pulse number of 72 (x·p=72) with respect to the fundamental of the voltage and the current of the electrical AC voltage system 11 results, for example, on the primary side of the transformer 7 having rectifier units 2 with a pulse number of x=24, p=3 phases R, Y, B and with n=2 transformers, with the result that essentially only very low harmonics which are lower than the seventy-first harmonic with respect to the fundamental of the voltage and the current of the electrical AC voltage system 11 advantageously occur.

In such exemplary embodiments of the converter circuit shown in FIG. 2 and FIG. 3, the three-phase secondary windings 9 are preferably phase-shifted in relation to one another with respect to a set of secondary windings 10. The preferred phase shift with respect to in each case two secondary windings 9 of a set of secondary windings 10 is an integral multiple of $$\left(\frac{60 \cdot p}{n \cdot m}\right)$$

degrees. In the first exemplary embodiment of the converter circuit shown in FIG. 2, a phase shift with respect to in each case two secondary windings 9 of a set of secondary windings 10 of an integral multiple of 30 degrees thus results. Furthermore, in the second embodiment of the converter circuit according to the invention shown in FIG. 3, a phase shift with respect to in each case two secondary windings 9 of a set of secondary windings 10 of an integral multiple of 20 degrees results. In addition, in the third embodiment of the converter circuit according to the invention shown in FIG. 10, a phase shift with respect to in each case two secondary windings 9 of a set of secondary windings 10 of an integral multiple of 15 degrees thus results. These phase shifts result at best, i.e. depending on the operating state, in the advantageous pulse numbers, which have already been specified above in relation to FIG. 2, FIG. 3 and FIG. 10, on the primary side of the transformer 7.

Furthermore, in general and in the exemplary embodiments of the converter circuit a shown in FIG. 2, FIG. 3 and FIG. 10, the three-phase secondary windings 9 are phase-shifted in relation to one another with respect to a transformer 7. The phase shift with respect to in each case two secondary windings 9 of a transformer 7 can be an integral multiple of $$\left(\frac{60}{n \cdot m}\right)$$

degrees or $$\left(\frac{360}{x \cdot p}\right)$$

degrees, where x is the abovementioned pulse number of a rectifier unit 2. The formulae specified above for the phase shift with respect to in each case two secondary windings 9 of a transformer 7 are equivalent. In the first exemplary embodiment of the converter circuit shown in FIG. 2, a phase shift with respect to in each case two secondary windings 9 of a transformer 7 of an integral multiple of 10 degrees thus results. Furthermore, in the second exemplary embodiment of the converter circuit shown in FIG. 3, a phase shift with respect to in each case two secondary windings 9 of a transformer 7 of an integral multiple of 6 ⅔ degrees results. Furthermore, in the third exemplary embodiment of the converter circuit shown in FIG. 10, a phase shift with respect to in each case two secondary windings 9 of a transformer 7 of an integral multiple of 5 degrees results. This phase shift advantageously results in secondary-side elimination of harmonics with respect to the fundamental of the voltage and the current of an electrical AC voltage system which is connected on the input side to the converter circuit.

Furthermore, in the exemplary embodiments of the converter circuit shown in FIG. 2, FIG. 3 and FIG. 10, the primary windings 8 of the transformers are phase-shifted in relation to one another. The phase shift with respect to in each case two primary windings can be an integral multiple of 60/n degrees. In the first exemplary embodiment of the converter circuit shown in FIG. 2 and in the third exemplary embodiment shown in FIG. 10, a phase shift with respect to in each case two primary windings 8 of an integral multiple of 30 degrees thus results. Furthermore, in the second exemplary embodiment of the converter circuit shown in FIG. 3, a phase shift with respect to in each case two primary windings 8 of an integral multiple of 20 degrees results. This above-described phase shift of the primary windings 8 with respect to in each case two transformers 7 results in an identical arrangement design for the secondary windings 9 of the transformer 7, with the result that production can be simplified and thus, in addition, costs can be saved.

Figure 4:
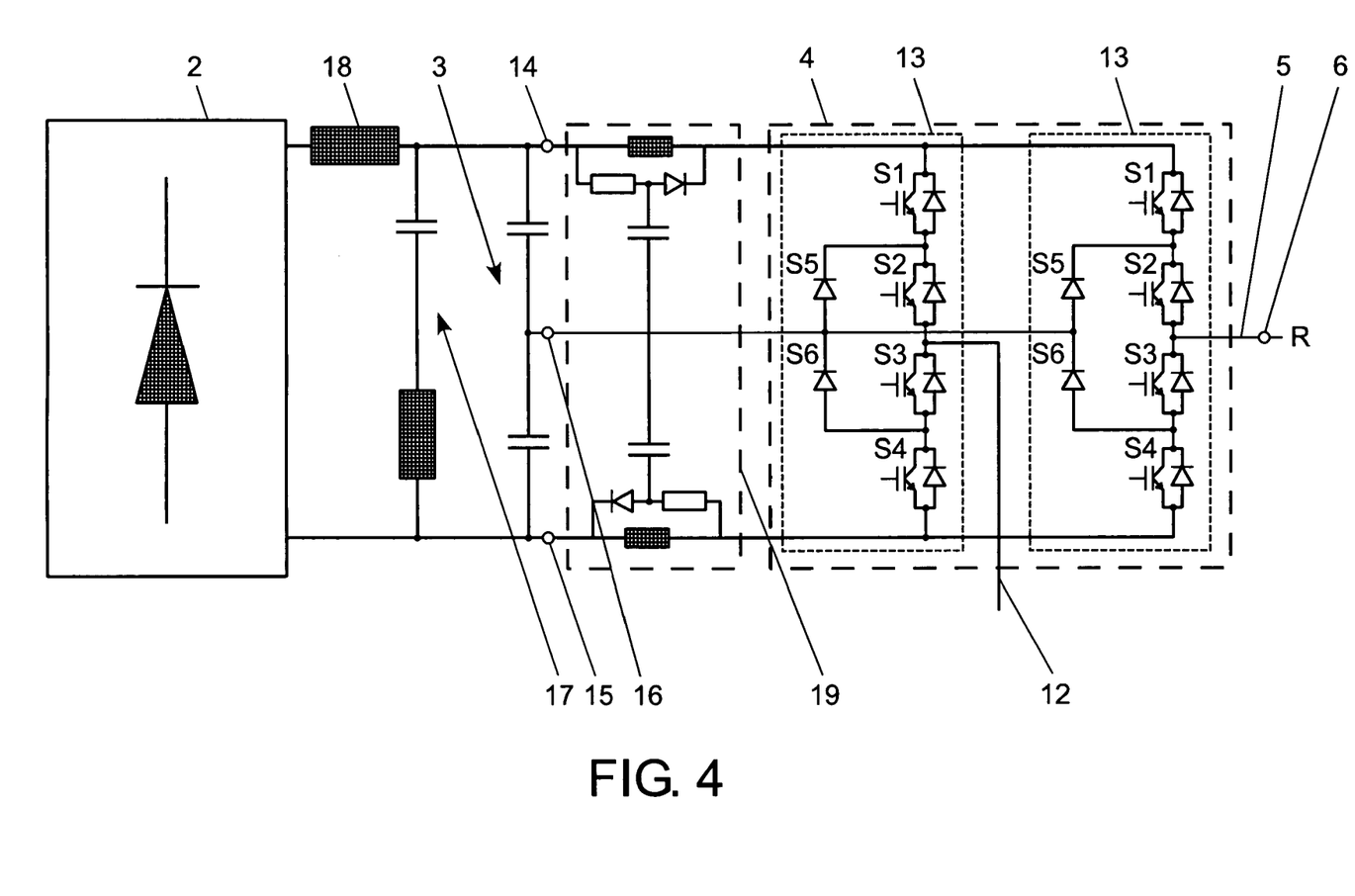
FIG. 4 shows an exemplary embodiment of a converter circuit element of the polyphase converter circuit as shown in FIG. 1 or FIG. 2 with an exemplary embodiment of an inverter unit.
Figure 5:
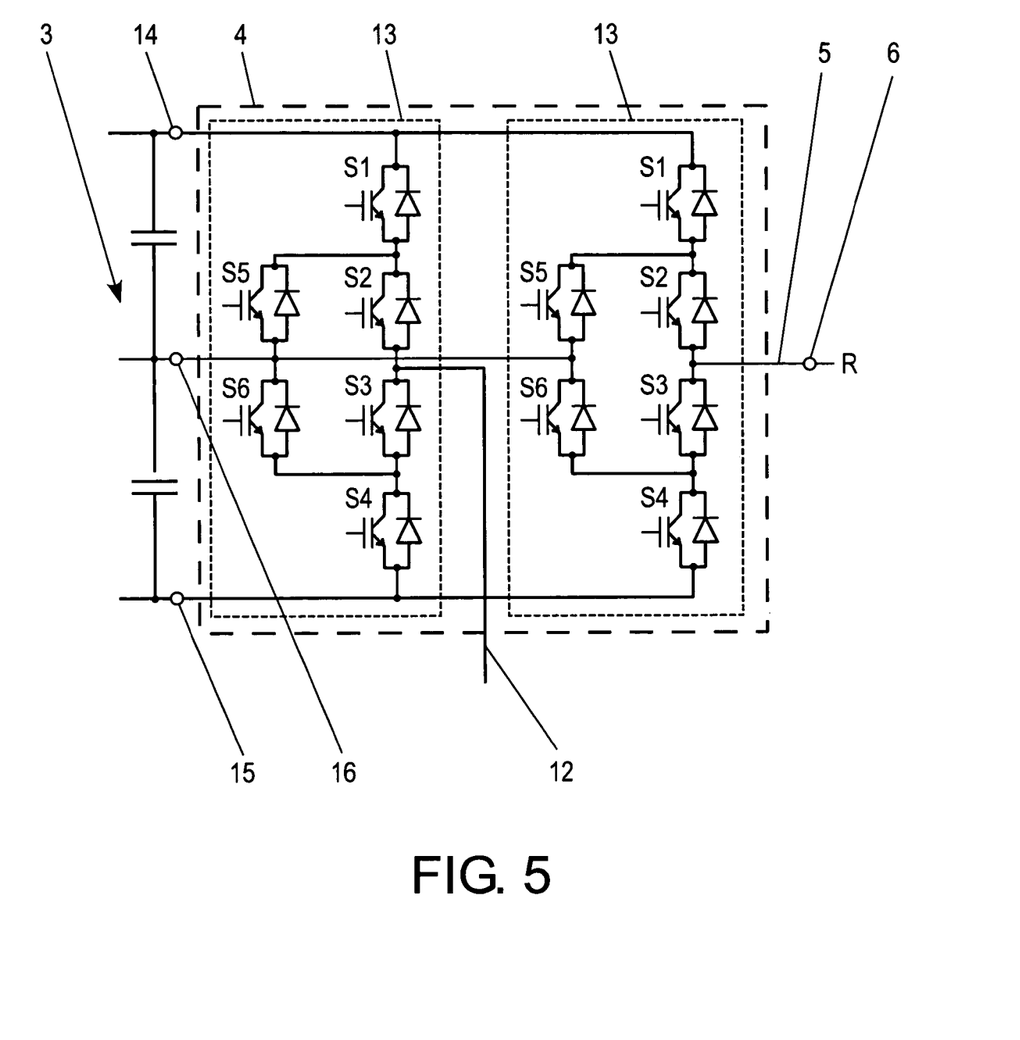
FIG. 5 shows a second exemplary embodiment of an inverter unit of the converter circuit element shown in FIG. 4.

FIG. 4 illustrates a first exemplary embodiment of a converter circuit element 1 of the polyphase converter circuit according to the invention shown in FIG. 1 or FIG. 2 with a first embodiment of an inverter unit 4. The converter circuit element 1 comprises the abovementioned DC voltage circuit 3, which is formed by two series-connected capacitors and has a first main connection 14, a second main connection 15 and a connection element 16 formed by the two adjacent capacitors which are connected to one another. As shown in FIG. 4, the inverter unit 4 has two pairs of branches 13 for the purpose of connecting three switching voltage levels, the respective pair of branches 13 having a first, second, third and fourth drivable, bidirectional power semiconductor switch S1, S2, S3, S4 and a fifth and sixth power semiconductor switch S5, S6. Each drivable, bidirectional power semiconductor switch S1, S2, S3, S4 is in particular formed by a hard-switched gate turn-off thyristor or by an insulated gate bipolar transistor (IGBT) and by a diode which is connected back-to-back in parallel with the gate turn-off thyristor or bipolar transistor. However, it is also conceivable for an abovementioned drivable, bidirectional power semiconductor switch to be in the form of, for example, a power MOSFET having a diode which is also connected back-to-back in parallel. As shown in FIG. 4, the fifth and sixth power semiconductor switches S5, S6 are non-drivable, unidirectional power semiconductor switches, each formed by a diode. In this case, the fifth and sixth power semiconductor switches form a passive clamping switching group. As shown in FIG. 4, in the case of each pair of branches 13 the first, second, third and fourth power semiconductor switches S1, S2, S3, S4 are connected in series and the first power semiconductor switch S1 is connected to the first main connection 14, and the fourth power semiconductor switch S4 is connected to the second main connection 15. Furthermore, the fifth and sixth power semiconductor switches S5, S6 are connected in series, the connecting point between the fifth power semiconductor switch S5 and the sixth power semiconductor switch S6 being connected to the connection element 16, the fifth power semiconductor switch S6 being connected to the connecting point between the first power semiconductor switch S1 and the second power semiconductor switch S2, and the sixth power semiconductor switch S6 being connected to the connecting point between the third power semiconductor switch S3 and the fourth power semi-conductor switch S4. FIG. 5 shows a second exemplary embodiment of an inverter unit 4 of the converter circuit element 1 shown in FIG. 4. In contrast to the first exemplary embodiment of the inverter unit 4 shown in FIG. 4, in the second embodiment of the inverter unit 4 shown in FIG. 5 the fifth and sixth power semiconductor switches S5, S6 are likewise drivable, bidirectional power semiconductor switches. Each drivable, bidirectional power semiconductor switch S5, S6 is in particular formed by a hard-switched gate turn-off thyristor or by an insulated gate bipolar transistor (IGBT) and by a diode which is connected back-to-back in parallel with the gate turn-off thyristor or bipolar transistor. However, it is also conceivable for an abovementioned drivable, bidirectional power semiconductor switch to be in the form of, for example, a power MOSFET also having a diode connected back-to-back in parallel. As shown in FIG. 5, the fifth and sixth power semiconductor switches S5, S6 then form an active clamping switching group.

The exemplary DC voltage circuit 3 shown in FIG. 4 can have a resonant circuit 17 which is tuned to a harmonic frequency. The resonant circuit 17 comprises an inductance and a capacitance which is connected in series with said inductance, the resonant circuit 17 being connected in parallel with the two series-connected capacitors in the DC voltage circuit 3. It is advantageously possible, owing to the resonant circuit 17, for a lower-order harmonic occurring in the DC voltage of the DC voltage circuit 3, for example, with respect to the fundamental of the voltage of the electrical AC voltage system 11, such as the second harmonic, to be filtered out by corresponding tuning.

Furthermore, a smoothing inductance 18 is connected between the rectifier unit 2 and the DC voltage circuit 3, as shown in FIG. 4. This smoothing inductance 18 advantageously serves the purpose of smoothing the direct current in the DC voltage intermediate circuit 3.

Furthermore, as shown in FIG. 4, a current rise limit circuit 19 can be connected between the DC voltage circuit 3 and the inverter unit 4, said current rise limit circuit 19 being connected in particular to the first main connection 14, to the second main connection 15 and to the connection element 16 in the DC voltage circuit 3, in this case the two pairs of branches 13 being connected to the current rise limit circuit 19, as shown in FIG. 4. It is advantageously possible by means of the current rise limit circuit 19 for rates of current rise to be limited which are produced in the event of switching procedures of the power semiconductor switches S1, S2, S3, S4, S5, S6 and lie above the maximum permissible value for the power semiconductor switches S1, S2, S3, S4, S5, S6.

It goes without saying that the exemplary converter circuit element 1 shown in FIG. 4 having the above-described components 17, 18, 19 may also be configured using the second exemplary embodiment of the inverter unit 4 shown in FIG. 5.

In contrast to the exemplary converter circuit element 1 shown in FIG. 4, it is also conceivable for the DC voltage circuit 3 to be formed only by one capacitor, the DC voltage circuit 3 in this case only having a first and second main connection 14, 15 but no connection element 16. The inverter unit 4 in this case has two pairs of branches for the purpose of connecting two switching voltage levels, the pairs of branches being connected to the first and second main connections 14, 15. It goes without saying that such a converter circuit element 1 may likewise be provided with the components 17, 18, 19 which have been described and are shown in FIG. 4.

In the exemplary converter circuit shown in FIG. 3, each inverter unit 4 has an associated local controller unit 20, drivable power semiconductor switches S1, S2, S3, S4, S5, S6 of the inverter unit 4 being connected to the associated local controller unit 20. Furthermore, a higher-order controller unit 21 is provided which is connected to each local controller unit 20. The higher-order controller unit 21 shown in FIG. 3 is preferably fed, on the input side, each phase connection current actual value $I_{R,act.}$, $I_{Y,act.}$, $I_{B,act.}$ of each phase connection 6, the torque actual value $M_{act.}$ and the magnetic flux actual value $\Phi_{act.}$ of a rotating electrical machine which can be connected to the phase connections 5. The torque actual value $M_{act.}$ and the magnetic flux actual value $\Phi_{act.}$ are observed by a separate observer, which is not illustrated in FIG. 3 for reasons of clarity, from the phase connection current actual values $I_{R,act.}$, $I_{Y,act.}$, $I_{B,act.}$ and the phase connection voltage actual values. In addition, a voltage reference value $U_{ref}$ is present at the output of the higher-order controller unit 21 and is fed to each local controller unit 20 on the input side. The higher-order controller unit 21 advantageously serves the purpose of observing the variables of the electrical machine such as torque actual value $M_{act.}$ and magnetic flux actual value $\Phi_{act.}$. The higher-order controller unit 21 serves the purpose of regulating the torque and is used for system control of the entire converter circuit. The local controller units 20 advantageously serve the purpose of regulating the potential of the center point of the DC voltage circuit 3 of the respective converter circuit element. Then, corresponding switching signals are produced from the voltage reference value $U_{ref}$ for the purpose of driving the drivable power semiconductor switches S1, S2, S3, S4, S5, S6 of the associated inverter unit 4 such that the phase voltage which is present at the respective phase connection 6 corresponds to the associated voltage reference value $U_{ref}$ in the regulated state. This distributed structure of local controller units 20 and a higher-order controller unit 21 reduces the number of connections required within the entire converter circuit and makes it possible for phase-related control tasks to be carried out locally on the drivable power semiconductor switches S1, S2, S3, S4, S5, S6.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List of References

1 Converter circuit element
2 Rectifier unit
3 DC voltage circuit
4 Inverter unit
5 First AC voltage output
6 Phase connection
7 Transformer
8 Primary winding
9 Secondary winding
10 Set of secondary windings
11 Electrical AC voltage system
12 Second AC voltage output
13 Pair of branches
14 First main connection of the DC voltage circuit
15 Second main connection of the DC voltage circuit
16 Connection element of the DC voltage circuit
17 Resonant circuit
18 Smoothing inductance
19 Current rise limit circuit
20 Local controller unit
21 Higher-order controller unit

What is claimed is:

1. A polyphase converter circuit having $p \geq 3$ phases (R, Y, B) and a converter circuit element provided for each phase (R, Y, B), each converter circuit element having a single rectifier unit, a DC voltage circuit which is connected to the rectifier unit and an inverter unit which is connected to the DC voltage circuit, and a first AC voltage output of each inverter unit forming a phase connection, and second AC voltage outputs of the inverter units being star-connected, wherein n transformers are provided, each having a primary winding and m three-phase secondary windings, where $n \geq 2$ and $m \geq 3$, wherein p sets of secondary windings are provided, each set of secondary windings being formed by in each case $$\frac{m}{p}$$

three-phase secondary windings of each transformer, and wherein each set of secondary windings with the associated secondary windings is connected to the rectifier unit of a respective converter circuit element.

2. The converter circuit as claimed in claim 1, wherein the three-phase secondary windings are phase-shifted in relation to one another with respect to a set of secondary windings.

3. The converter circuit as claimed in claim 2, wherein the phase shift with respect to in each case two secondary windings of a set of secondary windings is an integral multiple of $$\left(\frac{60 \cdot p}{n \cdot m}\right)$$

degrees.

4. The converter circuit as claimed in claim 3, wherein the three-phase secondary windings are phase-shifted in relation to one another with respect to a transformer.

5. The converter circuit as claimed in claim 4, wherein the phase shift with respect to in each case two secondary windings of a transformer is an integral multiple of $$\left(\frac{360}{x \cdot p}\right)$$

degrees, where x is the pulse number of a rectifier unit.

6. The converter circuit as claimed in claim 4, wherein the phase shift with respect to in each case two secondary windings of a transformer is an integral multiple of $$\left(\frac{60}{n \cdot m}\right)$$

degrees.

7. The converter circuit as claimed in claim 6, wherein the primary windings of the transformers are phase-shifted in relation to one another.

8. The converter circuit as claimed in claim 7, wherein the phase shift with respect to in each case two primary windings is an integral multiple of 60/n degrees.

9. The converter circuit as claimed in claim 8, wherein the DC voltage circuit has a resonant circuit which is tuned to a harmonic frequency.

10. The converter circuit as claimed in claim 8, wherein a smoothing inductance is connected between the rectifier unit and the DC voltage circuit.

11. The converter circuit as claimed in claim 8, wherein a current rise limit circuit is connected between the DC voltage circuit and the inverter unit.

12. The converter circuit as claimed in claim 8, wherein each inverter unit has an associated local controller unit, drivable power semiconductor switches of the inverter unit being connected to the associated local controller unit, and wherein a higher-order controller unit is provided which is connected to each local controller unit.

13. The converter circuit as claimed in claim 12, wherein the higher-order controller unit is fed, on the input side, each phase connection current actual value ($I_{R,act.}$, $I_{Y,act.}$, $I_{B,act.}$) of each phase connection, the torque actual value ($M_{act.}$) and the magnetic flux actual value ($\Phi_{act.}$) of a rotating electrical machine which can be connected to the phase connections, and wherein a reference voltage ($U_{ref}$) is present at the output of the higher-order controller unit and is fed to each local controller unit on the input side.

14. The converter circuit as claimed in claim 1, wherein the three-phase secondary windings are phase-shifted in relation to one another with respect to a transformer.

15. The converter circuit as claimed in claim 1, wherein the primary windings of the transformers are phase-shifted in relation to one another.

16. The converter circuit as claimed in claim 1, wherein the DC voltage circuit has a resonant circuit which is tuned to a harmonic frequency.

17. The converter circuit as claimed in claim 1, wherein a smoothing inductance is connected between the rectifier unit and the DC voltage circuit.

18. The converter circuit as claimed in claim 1, wherein a current rise limit circuit is connected between the DC voltage circuit and the inverter unit.

19. The converter circuit as claimed in claim 1, wherein each inverter unit has an associated local controller unit, drivable power semiconductor switches of the inverter unit being connected to the associated local controller unit, and wherein a higher-order controller unit is provided which is connected to each local controller unit.

* * * * *